No. 873,899. PATENTED DEC. 17, 1907.
B. SALOMON.
CURRENT SUPPLYING ARRANGEMENT.
APPLICATION FILED MAR. 1, 1906.

UNITED STATES PATENT OFFICE.

BERNHARD SALOMON, OF FRANKFORT-ON-THE-MAIN, GERMANY, ASSIGNOR TO FELTEN UND GUILLEAUME-LAHMEYERWERKE AKTIEN-GESELLSCHAFT, OF FRANKFORT-ON-THE-MAIN, GERMANY.

CURRENT-SUPPLYING ARRANGEMENT.

No. 873,899.     Specification of Letters Patent.     Patented Dec. 17, 1907.

Application filed March 1, 1906. Serial No. 303,734.

*To all whom it may concern:*

Be it known that I, BERNHARD SALOMON, a subject of the German Emperor, and resident at Frankfort-on-the-Main, Germany, have invented certain new and useful Improvements in Current-Supplying Arrangements, of which the following is a specification.

From a stationary conductor current is in general supplied to motor-cars, electrically propelled ships and the like by means of a trolley, which moves along the conductor. Sliding bows may be equally employed in place of trolleys, which latter require to be connected with the vehicles, ships and the like by rods, either rigidly or yieldingly. In cases, where a sliding bow or a trolley is employed, the vehicle, ship or the like is obliged to follow the conductor, in other words, it is not permitted to deviate from the direction of the conductor. In other cases, where the vehicle, ship or the like is connected with the trolley not by means of a rigid or movable rod, but by means of a rope containing the lines, that the trolley requires to be drawn by the vehicle, ship or the like, the latter is permitted, it is true, to move in directions other than that of the conductor. However, the trolley will in such cases be subjected to the draft, whereby it may be detached from the conductor. Trolleys movably disposed on the conductor present the defect, that the latter is very much strained by the considerable weight of the trolley.

My invention relates to a new system of supplying electric current from a stationary conductor to ships, vehicles and the like, whereby the said defects are avoided. This system comprises a subsidiary motor-vehicle, motor-ship and the like, which is arranged to follow the conductor and to take up the current from the same by means of a slide bow or trolley and is in turn connected with the ship, vehicle and the like to be propelled or driven by means of a conductor.

I will now proceed to first describe my invention as applied to ships in channels, water-courses and the like.

For the purpose of illustrating my invention, I have shown, in the accompanying drawings, a ship and a subsidiary boat embodying my invention, and intended to be used in channels or water courses having a stationary conductor arranged along the bank.

Figure 1:
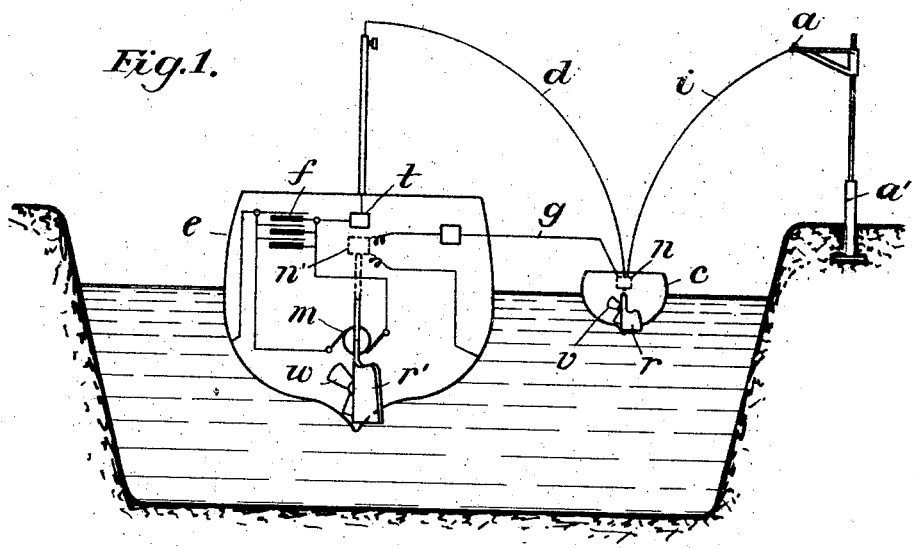
Figure 2:
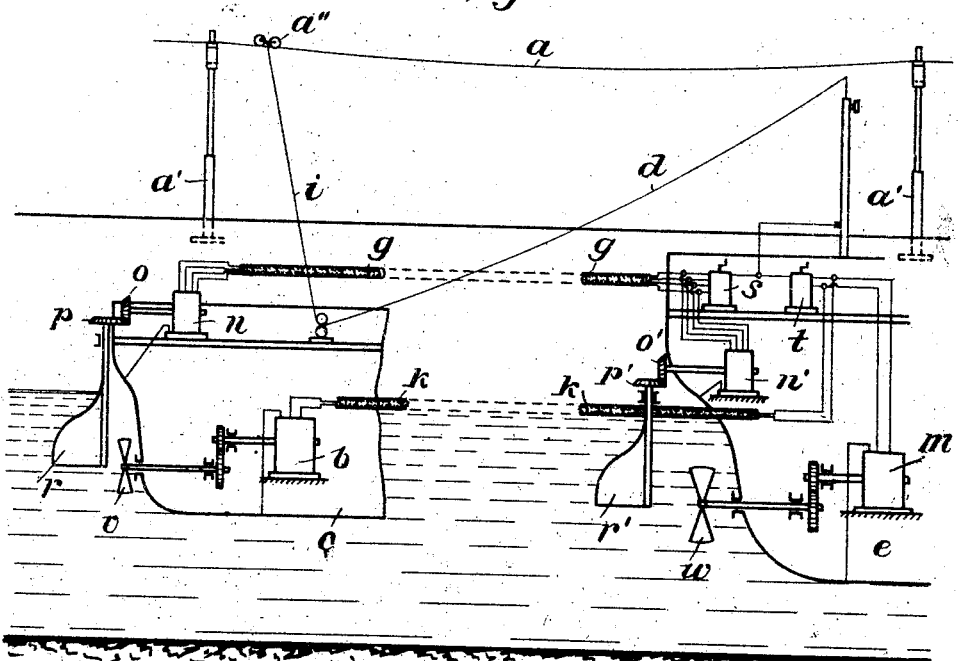

In said drawings, Figure 1 is a cross-section of a canal showing, diagrammatically, a ship, a subsidiary boat, and a stationary conductor, and the connections supplying current to the boat and to the ship, and, Fig. 2 is a side-view, showing the stern of the ship and of the motor boat, and means to control the speed of the latter from the ship.

The conductors $a$ are suspended in the usual manner from arms on poles $a'$ disposed along the shore or bank. A subsidiary boat $c$ is made to float in the water and to propel itself in any known manner beneath the conductors. The motor $b$ of this subsidiary boat may be an electromotor, or any other motor. The current may be taken up from the conductors $a$ and conducted to the subsidiary boat in any known and approved manner a trolley $i$ being conventionally shown in the drawings. The subsidiary boat is in turn connected with a ship $e$ to be propelled or to be supplied with current by means of a separate conductor $d$. This separate conductor may be disposed above or in the water and may be detachably connected with the ship or the subsidiary boat and may be shiftable. On board the ship a storage battery $f$ is preferably disposed, which is arranged to supply current to the motor $m$, should from any reason the supply of current from the main conductors to the subsidiary boat be stopped, for instance during the passage beneath bridges or when making way for other boats or ships, etc.

Preferably the subsidiary boat $c$ is connected with the ship by means of any known system $g$ of steering at distance, so that it may be directed from the ship. Thereby the management of the subsidiary boat is simplified without reducing its capacity of maneuvering. In Fig. 2 I have shown an example of such steering means, in which the propeller $v$ of the subsidiary boat $c$ is connected with the motor $b$, to which current is supplied from the conductor $a$ through the trolley $a''$, conductors $i$, $d$, controller $t$ on the ship $e$, and conductors $k$ connecting said controller with the motor $b$. Similarly the steering mechanism $o$, $p$, and rudder $r$ of the subsidiary boat are connected with a reversible electro-motor $n$ by conductors $q$ leading from a controller $s$ on the ship $e$. The controller $s$ is supplied with current from the conductor $a$ through the trolley $a''$ and conductors $i$, $d$. With said controller $s$ is also electrically connected the reversible motor n' on the ship e, which motor drives the steering mechanism o', p', and controls the rudder r' of the ship. The propeller w of the ship e is driven by a motor m connected with the controller t. While in the drawing, for the purpose of illustration, the conductors are shown as being separated, it will be understood that in practice it will be preferable to combine them in a single cable. The speed of the subsidiary boat may be preferably made to depend upon that of the ship. This may be effected in any known manner, say by means of a common governing device t or by adapting the subsidiary boat to alter its speed in accordance with that of the ship, say according to the known system of Lombard-Gerin. Such a connection is indicated in the drawing by the conductor g.

Floating vessels and the like provided with electric apparatuses, which require to be moved away from the conductor for a considerable distance, such as for example dredgers and the like, can be supplied with current from a stationary conductor by means of a subsidiary boat as described above. The same is the case with vehicles, portable machines and the like, for example agricultural machines etc.

What I claim as my invention, and desire to secure by Letters Patent, is—

1. The combination with a stationary electric conductor, and an electrically driven movable apparatus, of means for conducting current from the conductor to said apparatus including an independently propelled device supported independently of the conductor.

2. The combination with a stationary electric conductor, and an electrically driven movable apparatus, of means for conducting current from the conductor to said apparatus including an independently propelled device supported independently of the conductor and adapted to be controlled in its movements from said apparatus.

3. The combination with a stationary electric conductor, and an electrically driven movable apparatus, of means for conducting current from the conductor to said apparatus including an independently propelled device supported independently of and arranged to travel longitudinally of the conductor and between the same and said apparatus.

4. The combination with a stationary electric conductor extending along a waterway and a vessel in said waterway provided with electrically operated propelling mechanism, of means for conducting current from the conductor to said propelling mechanism of said vessel and including an independently propelled device supported independently of the conductor.

5. The combination with a stationary electric conductor extending along a waterway and a vessel in said waterway provided with electrically operated propelling mechanism, of means for conducting current from the conductor to said propelling mechanism of said vessel and including an independently propelled device supported independently of the conductor and adapted to be controlled in its movements from said vessel.

6. The combination with a stationary electric conductor extending along a waterway and a vessel in said waterway provided with electrically operated propelling mechanism, of a subsidiary independently propelled boat, and means for conducting current from the conductor to said subsidiary boat and from the latter to the propelling mechanism of the vessel.

7. The combination with a stationary electric conductor extending along a waterway and a vessel in said waterway provided with electrically operated propelling mechanism, of means for transmitting current from the conductor to the propelling mechanism of said vessel including an independently propelled subsidiary boat, and means for steering said subsidiary boat from the vessel.

8. The combination with a stationary electric conductor extending along a waterway and a vessel in said waterway provided with electrically operated propelling mechanism, of means for transmitting current from the conductor to the propelling mechanism of said vessel including an independently propelled subsidiary boat, and means controlled from said vessel for steering and regulating the speed of said subsidiary boat.

In testimony whereof I have signed my name to this specification in the presence of two subscribing witnesses.

BERNHARD SALOMON.

Witnesses:
LEONHARD SEIP,
JEAN GRUND.